July 22, 1930.  O. A. ALVRING  1,770,898
AUTOMATIC LIQUID METER
Filed May 16, 1927
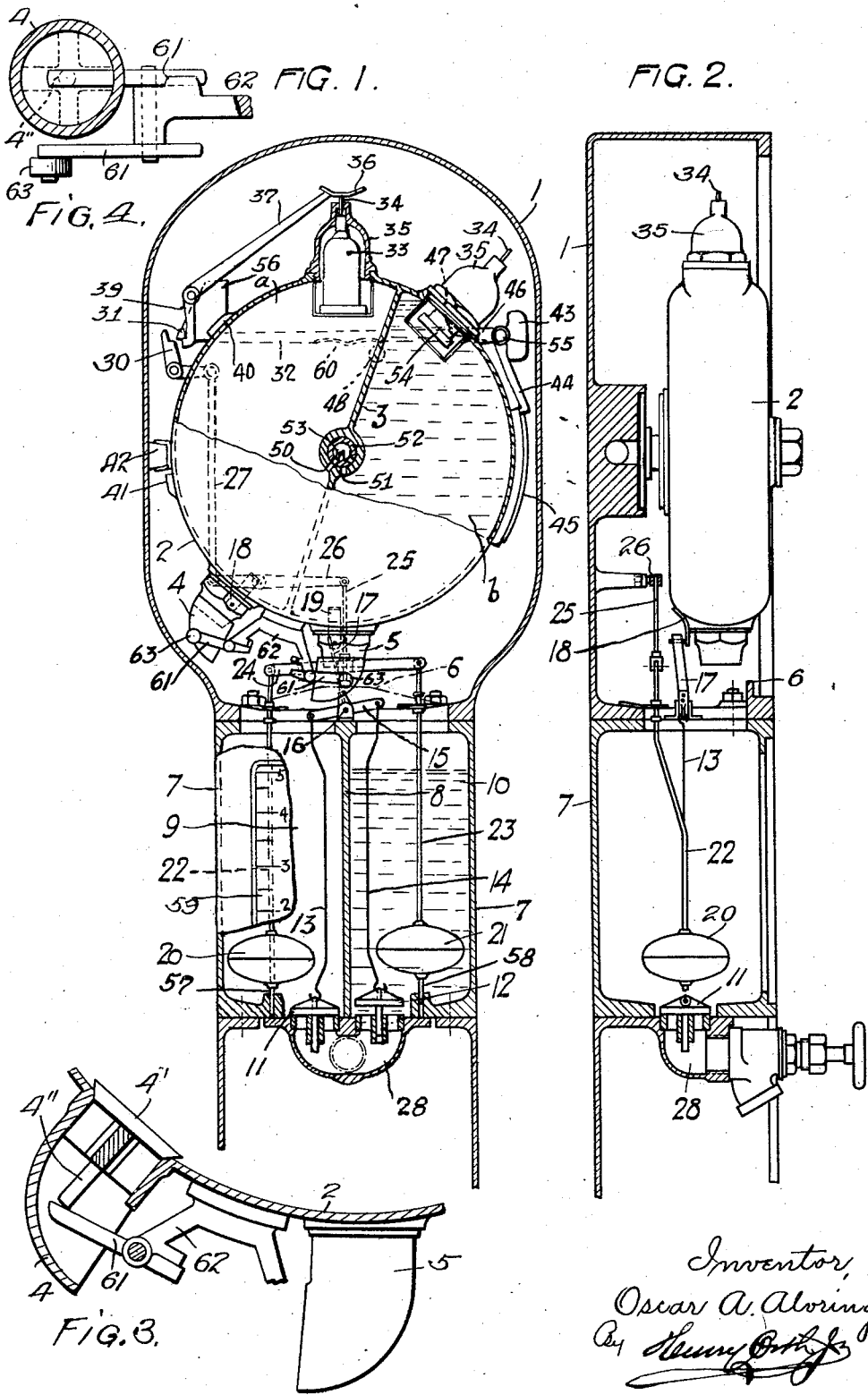

Patented July 22, 1930

1,770,898

UNITED STATES PATENT OFFICE

OSCAR A:SON ALVRING, OF MIDSOMMARKRANSEN, NEAR STOCKHOLM, SWEDEN

AUTOMATIC LIQUID METER

Application filed May 16, 1927, Serial No. 191,767, and in Sweden November 12, 1926.

This invention relates to automatic liquid meters of the kind in which the measuring vessel consists of a receptacle divided in a plurality of chambers which under the influence of the weight of the liquid to be measured rotates into definite set positions in each of which one chamber of the receptacle is filled and another chamber at the same time emptied. In such apparatus it is well known to provide a receptacle in communication with a casing surrounding the measuring vessel to receive the liquid when poured out and to provide a float within said receptacle to control a locking device for the measuring vessel in order to prevent it from initiating a measuring operation before the liquid previously measured off is completely removed from the measuring vessel and from the said receiving receptacle as well.

It is desirable in connection with such measuring apparatus to obtain a visible supervision of the measuring operation so that a purchaser may himself see that the proper quantity of liquid is really poured out at each operation. One method of enabling such a supervision would be to cause the liquid after each measuring operation to remain for a certain period of time within the windowed receiving receptacle before emptying same. Such a method, however, would necessitate a considerably increased time interval following each measuring operation so that the possibility of supervision should be obtained at the cost of a considerable loss of time in effecting the measuring.

According to the present invention a visible supervision following each measuring operation is enabled without decreasing the speed of operation of the apparatus by the provision of two receiving receptacles or chambers adapted to alternately receive a measured off quantity, said receptacles or chambers being provided with discharge valves controlled by the rotary measuring vessel in such a way as to be alternately closed and alternately opened.

In the drawing one embodiment of the invention is illustrated. Fig. 1 is a front elevation of the apparatus with certain parts in section and certain other parts removed, those parts only necessary for the understanding of the invention being shown. Fig. 2 is a side elevation as seen at right angles to that shown in Fig. 1, likewise partly in section and with certain parts removed.

Fig. 3 is an enlarged vertical section of one of the fluid outlets and its control valves.

Fig. 4 is a detail plan view of the valve and operating lever shown in Fig. 3.

Mounted within an appropriate casing 1 is a measuring vessel 2 divided by a partition 3 in two chambers $a$ and $b$ having inlets at 50, 51 and outlets at 4, 5 with the associated valves controlled by a stationary cam 6 in well known manner.

The vessel 2 is rotatably carried by a central hollow shaft 52 associated with a supply pipe and provided with an aperture 53 in its wall to fill either chamber $a$ or $b$ according to the position of the vessel 2.

Slidably mounted in each of the chambers $a$ and $b$ is a float 33 and 54, respectively, enclosed by a casing 35 communicating at its bottom with the interior of the vessel 2 and provided at its top with an aperture through which a spindle 34 extends to control the movement of the vessel 2 in the manner hereinafter fully described.

To lock the vessel 2 in its different set positions there is provided a pawl 44 engaging a projection 45 from the vessel 2 and forming one arm of a bell-crank lever 44, 46 the other arm 46 of which engages the bottom surface of a projection 47 from a lever 32. The bell-crank lever 44, 46 and the lever 32 are rotatably mounted on a common shaft 55 and loaded by weights at 43 and 56, respectively.

40 and 41 denote projections from the vessel 2 adapted to engage a stationary projection 42 from the casing 1 to stop the vessel in its different set positions.

To control the lever 32 there is provided a double locking mechanism formed by the pawls 30, 39, engaging a wedge-shaped projection 31 from the free loaded end of the lever 32. The pawl 39 forms one arm of a bell-crank lever the other arm of which 37 carries a lug 36 controlled by the floats 33, 54. The mode of controlling the second pawl 30 will be described in the following portion of this description.

The casing 1 is continued downwardly by a receptacle 7 divided by means of a vertical partition 8 in two compartments 9 and 10. Each compartment is in open communication at its top with the interior of the casing 1. Provided in the bottom of each compartment is a discharge valve 11, 12, respectively. Said valves are each connected by a link 13 or 14, respectively, to a corresponding arm of a balance lever 15 pivoted at 16 to the cover of the receptacle 7 and carrying an upstanding arm 17 reaching up into the path of the projections 18, 19 on the vessel 2, one at each of the outlets 4, 5.

Provided in each of the compartments 9, 10 is a float 20, 21, respectively. Said floats which are guided against lateral movements by means of the spindles 57, 58 fitting in holes at the bottom of the receptacle 7 are connected by the rods 22, 23 to opposite ends of an arm 24 connected at its middle point to a link 25 which is in turn connected by a lever 26 and another link 27 to the pawl 30 above referred to for the measuring vessel 2.

The apparatus operates as follows:

Let it be assumed that during the operation of the apparatus the vessel 2 has just reached the position as shown in Fig. 1 in which position, as may easily be seen, chamber $a$ and compartment 9 are empty and adapted to be filled whereas chamber $b$ and compartment 10 are filled and adapted to be emptied. As a result the float 20 will be in its lowermost position and the float 21 in its uppermost position and with said floats in these positions the lever 24 occupies a position wherein the pawl 30 is out of engagement with the projection 31 at the free end of the lever 32 as shown in Fig. 1. It is further seen that in the position of the vessel 2 above referred to the projection 19 has just swung the arm 17 to the position as shown in which the bottom valve 11 is closed and the bottom valve 12 open enabling emptying of compartment 10 and filling of compartment 9 (through the discharge valve 5 opened by means of the stationary cam 6) simultaneously with the filling of the chamber $a$. When the compartment 9 during this operation has received a sufficient quantity of liquid to raise the float 20 the lever 26 is raised to move the pawl 30 into engagement with the projection 31.

When the chamber $a$ is completely filled the float 33 mounted therein is raised whereby the spindle 34 raises the lug 36 mounted at the free end of the upper arm 37 of the bell-crank lever 37, 39, to such an extent that the lower arm thereof forming the pawl 39 is moved out of engagement with the projection 31. As soon as the compartment 10 is emptied during the filling of chamber $a$ also the pawl 30 as may readily be seen from the foregoing will be moved out of engagement with the projection 31. As a result the lever 32 is lowered to move the bell-crank lever 44, 46, by means of the projection 47 engaging the arm 46 of said lever, to such a position as to release the pawl 44 formed by the lower arm of the bell-crank lever 44, 46, from the projection 45 of the vessel 2 whereby the latter under the influence of the liquid contained in the chamber $a$ rotates counter clockwise until it is stopped by the projection 40 reaching the projection 42. As soon as the vessel 2 leaves the position as shown the spindle 34 is moved out of engagement with the lug 36 whereby the bell-crank lever 37, 39 swings back to its locking position. During the rotation of the vessel 2 a projection 48 on the vessel serving to limit the downward movement of the lever 32 when released raises said lever by engaging a cam 60 on the underside of said lever to the position as shown in which it is locked by the pawl 39 thereby permitting the pawl 44 to fall back behind the lower end of the projection 45 under the action of the load 43 to lock the vessel in the new position thereof.

After chambers $a$ and $b$ have thus been filled and emptied, respectively, and the vessel 2 swung to its extreme opposite position with the outlet 4 above the compartment 10 of the receiving vessel 7, the valve of the outlet 4 will be opened. The valves 4' (shown in Figs. 3 and 4) which control the outlets 4 and 5 may be of the puppet or mushroom type having stems 4" which project into the casings of the outlets. These valve-stems are actuated by means of levers 61 pivotally mounted on a bracket 62, fixed on the casing 2. Each lever 61 has two parallel arms as shown in Fig. 4, one of which arms, projects into the casing of the outlet and is adapted to operatively engage the stem of the valve in said casing, the other arm of each lever is outside the casing and carries on its free end a roller 63. When the vessel 2 is tilted to bring one of the outlets into position for discharging, the roller 63 of the lever controlling the valve of the outlet will ride on a cam 6 mounted on the receptacle 7 in the path of the lever and designed to raise the lever, so that the arms of the latter which project inside the casing of the outlet will engage the stem of the valve and raise the latter from its seat to allow the liquid in the vessel to escape. These operations afford sufficient time to enable the level within the compartment 9 to be observed and compared with any appropriate scale such as 59 which may be placed at or upon the window of the receptacle 7. With the measuring vessel 2 in its new set position, as above described, the arm 17 will be acted upon by the projection 18 so as to cause the balance lever 15 to turn on its pivot thereby closing the bottom valve 12 and opening the bottom valve 11. The liquid will now flow out of the compartment 9, the compartment 10 being at the same time filled with the liquid discharged from chamber $a$. The chamber $b$ is at the same time again filled with liquid, provided the measuring operation is to be continued.

With the operation described the liquid following each measuring operation will remain in a compartment of the receiving receptacle 7 for a sufficient long period of time to enable observation of its level.

The details of the design may of course be varied without departing from the principle of the invention.

What I claim is:

1. In an automatic liquid meter of the type comprising a tiltable, two-compartment measuring vessel adapted to tilt following each measuring operation; two receptacles to alternately receive a measured off quantity of liquid from said vessel, discharge valves in connection with said receptacles, a rocking lever, connections between said lever and said valves, and means to cause said rocking lever to rock alternately in opposite directions as a result of two successive tilting movements of said vessel, so as to open said valves alternately.

2. In an automatic liquid meter comprising a tiltable, two compartment measuring vessel adapted to tilt following each measuring operation, two receptacles to alternately receive a measured quantity of liquid from said vessel, discharge valves in connection with said receptacles, a rocking lever, connections between the latter and said valves, means to cause said rocking lever to rock alternately in opposite directions as a result of two successive tilting movements of said vessel so as to open said valves alternately, a float in each receptacle, a locking device for said vessel, and a system of levers to operatively connect said floats to the locking device to control the vessel.

In testimony whereof I have signed my name.

OSCAR A:SON ALVRING.